US 6,564,111 B1

(12) United States Patent
Gottschald

(10) Patent No.: US 6,564,111 B1
(45) Date of Patent: May 13, 2003

(54) METHOD AND DEVICE FOR FORMING A BEVEL ON THE EDGE OF A GLASS LENS

(75) Inventor: Lutz Gottschald, Meerbusch (DE)

(73) Assignee: Wernicke & Co. GmbH (DE)

( * ) Notice: Subject to any disclaimer, the term of this patent is extended or adjusted under 35 U.S.C. 154(b) by 0 days.

(21) Appl. No.: 09/601,749

(22) PCT Filed: Jan. 27, 1999

(86) PCT No.: PCT/EP99/00511
§ 371 (c)(1),
(2), (4) Date: Aug. 7, 2000

(87) PCT Pub. No.: WO99/40494
PCT Pub. Date: Aug. 12, 1999

(30) Foreign Application Priority Data

Feb. 5, 1998 (DE) .......................... 198 04 455

(51) Int. Cl.[7] .............................. G06F 19/00
(52) U.S. Cl. ............ 700/95; 451/42; 409/138
(58) Field of Search ............ 700/95, 96, 98, 700/117; 451/5, 8, 42, 43; 409/166, 138

(56) References Cited

U.S. PATENT DOCUMENTS

| 5,255,199 A | | 10/1993 | Barkman et al. ........... 700/175 |
| 5,630,746 A | * | 5/1997 | Gottschald et al. ............ 451/5 |
| 5,660,578 A | | 8/1997 | Clara ........................ 451/8 |
| 5,890,949 A | * | 4/1999 | Shibata ..................... 451/5 |
| 5,908,348 A | * | 6/1999 | Gottschald ................. 451/5 |
| 5,967,879 A | * | 10/1999 | Gottschald ................. 451/5 |
| 6,012,965 A | * | 1/2000 | Savoie ...................... 451/6 |
| 6,050,877 A | * | 4/2000 | Shibata et al. ............... 451/5 |
| 6,203,409 B1 | * | 3/2001 | Kennedy et al. ............. 451/43 |

FOREIGN PATENT DOCUMENTS

| EP | 0706439 | 4/1996 |
| WO | 93/23820 | 11/1993 |

* cited by examiner

Primary Examiner—John Follansbee
Assistant Examiner—Zoila Cabrera
(74) Attorney, Agent, or Firm—Ostrolenk, Faber, Gerb & Soffen, LLP

(57) ABSTRACT

The present invention relates to a method and a device for forming a bevel on the edge of a glass lens using a lens-edge machining apparatus with computer numerical control. The method of the present invention comprises the following steps: scanning the bevel groove of a glass-lens opening in a selected glass rim, said scanning including the shape of the cross section and the periphery of the bevel groove; sending the data thus obtained to a control device of the lens-edge machining apparatus; scanning the bevel groove of a glass-lens machining tool in order to determine the diameter and the shape of the cross section; sending the values thus obtained to the control device of the lens-edge machining apparatus; comparing the values of the bevel groove of the lens-edge machining tool; and machining the vebel according to the data obtained if the compared values are within a first allowance range which can be predetermined, machining the bevel according to a correction value if the compared values are within a second allowance range or interrupting the bevel machining process if the compared values are not in the first nor the second allowance ranges.

12 Claims, 3 Drawing Sheets

METHOD AND DEVICE FOR FORMING A BEVEL ON THE EDGE OF A GLASS LENS

Figure 1:
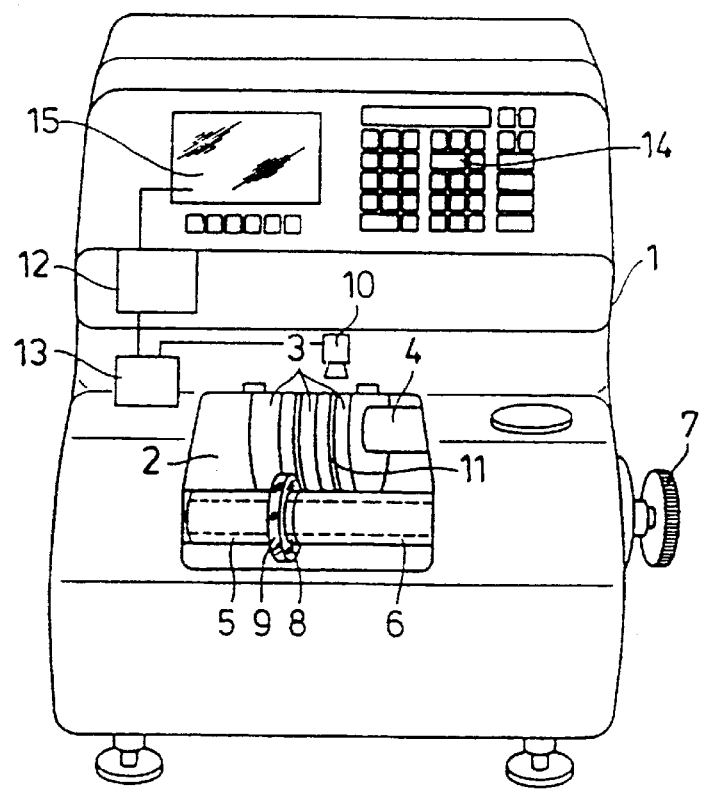

The invention relates to a method for producing a bevel on the edge of a spectacle lens using a CNC-controlled spectacle-lens edge-machining machine.

EP 0 706 439 B1 by the same applicant describes a method and an apparatus with which changes in the bevel because of the wear to a grinding wheel used for producing the bevel can be taken into consideration.

During the grinding of a bevel on spectacle lenses, wear to the grinding wheel arises in the bevel groove, the wear not only leading to a slow increase in the size of the finish-ground spectacle lenses, but also to an increase in the size of the angle of the bevel, i.e. to a flattening. The flattening of the bevel can be accepted to a certain degree as long as the spectacle lens is securely held in the bevel groove of the spectacle frame concerned. In order to achieve this, it is proposed according to EP 0 706 439 B1 to subject the spectacle lens, which has been ground around the circumferential contour, to a correction grinding which takes the flattening of the bevel into consideration. For this purpose, the spectacle-lens edge-machining machine has, adjacent to the grinding wheel, a support having a wedging groove whose wedge angle corresponds to a permissible, maximum angle of a bevel on the spectacle lens. If the spectacle lens, ground into shape and provided with a bevel, is inserted into the wedging groove, a measured value which is exclusively dependent on the radial wear of the grinding wheel is produced, as long as the angle of the groove of the shape-ground spectacle lens does not exceed the angle of the wedging groove on the support.

Until angle parity has been reached, its suffices to undertake a correction grinding which corresponds to the linear difference in radius. If the wear to the grinding wheel used for the bevel grinding is so great that the angle of the ridge bevel is greater than the angle of the wedging groove on the support, the spectacle lens to be measured can no longer enter with its ridge bevel completely into the wedging groove, so that a greater difference is measured than corresponds to the linear change in diameter of the grinding wheel. In this case, the spectacle-lens edge-machining machine can end the grinding procedure and output a signal which indicates to the operator that the grinding wheel has to be trimmed and has become unusable.

In order to ascertain whether the angle of the bevel on the shape-ground spectacle lens has exceeded a predetermined value, the support has a flat region in addition to the wedging groove, and at least one radius value for the tip of the bevel in the wedging groove and a further radius value with regard to the flat region are recorded. It can then be determined from the difference in these values in comparison to a desired value whether or not the change still lies within permissible limits.

The method and the apparatus disclosed in EP 0 706 439 B1 have been tried and tested, but require an additional correction grinding if there is a change to the bevel groove or to the diameter of the grinding wheel which requires correction. Also, it can only be ascertained that the grinding wheel has to be trimmed and has become unusable if a spectacle lens which has already been ground into shape is being measured on the support. Furthermore, in the case of the known method and apparatus the cross-sectional shape of the bevel groove in the spectacle frame, for which the spectacle lens which is to be ground into shape is intended, is not taken into consideration during this test procedure.

The invention is therefore based on the problem of providing a method and an apparatus for producing a bevel on the edge of a spectacle lens, using which the wear to a bevel groove in a spectacle-lens edge-machining tool is checked before the machining of the spectacle lens is carried out, and using which it is also possible to take into consideration the shape of the bevel groove in a selected spectacle frame.

Taking this problem as the starting point, a method for producing a bevel on the edge of a spectacle lens using a CNC-controlled spectacle-lens edge-machining machine is proposed comprising, according to the invention, the following steps: scanning the bevel groove of a spectacle-lens opening in a selected spectacle frame, including the cross-sectional shape and the circumference of the bevel groove, inputting the determined values into a control device of the spectacle-lens edge-machining machine, scanning the spectacle-lens edge-machining tool with regard to its diameter and the shape of its bevel groove, inputting the determined values into the control device of the spectacle-lens edge-machining machine, comparing the values of the cross-sectional shape of the bevel groove of the spectacle frame with the values of the cross-sectional shape of the bevel groove of the spectacle-lens edge-machining tool, carrying out the machining of the bevel using the determined values, if the compared values of the cross-sectional shape and the diameter of the spectacle-lens edge-machining tool lie within a predeterminable first tolerance range, or carrying out the machining of the bevel using a correction value, if the compared values of the cross-sectional shape lie within a second tolerance range and/or the diameter of the spectacle-lens edge-machining tool is smaller than a predeterminable minimum value, or breaking off the machining of the bevel, if the compared values lie outside the first and second tolerance range.

The invention is based on the consideration that, firstly, with regard to their cross-sectional shape the bevel grooves in the spectacle frame lie within a tolerance range, the cross-sectional shape of the bevel groove being determined by the depth of the bevel groove and the angle enclosed by the flanks of the bevel groove. The depth of the bevel groove and the flank angle and also the diameter of the spectacle-lens edge-machining tool can move within a permissible tolerance range.

Secondly, a new, unused spectacle-lens edge-machining tool has a bevel groove which can be produced very precisely with exacting tolerances. However, during the grinding of the bevel of a spectacle lens, wear to the spectacle-lens edge-machining tool with regard to its diameter and the cross-sectional shape of the bevel groove arises, the wear not only leading to an increase in the size of the finish-ground spectacle lens, but also to an increase in the size of the angle of the bevel, i.e. to a flattening.

If a comparison between the actual state of the bevel groove in the spectacle frame and that of the bevel groove in the spectacle-lens edge-machining tool is carried out, in many cases despite wear to the bevel groove having been ascertained and possibly after undertaking a correction during the production of the bevel, the spectacle-lens edge-machining tool can continue to be used if the cross-sectional shape of the bevel groove in the spectacle frame permits this. In this case, a reduction in the diameter of the spectacle-lens edge-machining tool can be taken into consideration by correcting the feed motion of the spectacle lens with regard to the spectacle-lens edge-machining tool.

Since the scanning of the bevel grooves in the spectacle frame and in the spectacle-lens edge-machining tool is carried out before the spectacle lens is machined into shape and provided with a bevel, additional correcting steps are not required, rather any correction required is included by computation in the data record for the CNC-controlled machining of the spectacle-lens edge, so that the spectacle-lens edge machining directly delivers a spectacle lens which is suitable for the selected spectacle frame, has been ground to shape and is provided with a bevel.

The scanning of the bevel grooves in the spectacle frame and in the spectacle-lens edge-machining tool can preferably be carried out in a contactless manner by means of video-scanner systems, and the cross-sectional shape of the bevel groove can be reproduced on a viewing screen. An apparatus for the contactless scanning of the bevel grooves in spectacle frames by means of a video-scanner system is described in DE 40 19 866 A1 by the same applicant. However, laser-scanner systems are also suitable.

The first tolerance range, which permits the machining of the bevel to be carried out using the determined values without including a correction value, may cover an angular range of the bevel groove of the spectacle frame, which is equal to or greater than the angular range of the bevel groove of the spectacle-lens edge-machining tool, may cover a depth range of the bevel groove of the spectacle frame, which is equal to or smaller than the depth range of the bevel groove of the spectacle-lens edge-machining tool, and may cover a diameter range of the spectacle-lens edge-machining tool, which is equal to or smaller than the desired diameter of the spectacle-lens edge-machining tool.

The second tolerance range, which permits the machining of the bevel to be carried out with a correction value being included, may cover an angular range of the bevel groove of the spectacle frame, which is smaller than or equal to the angular range of the bevel groove of the spectacle-lens edge-machining tool, in which the maximum value of the angle of the bevel groove of the spectacle-lens edge-machining tool must not exceed a predeterminable value, and the correction value is determined from the depth of penetration, which can be calculated from the actual angles of the bevel grooves of the spectacle frame and of the spectacle-lens edge-machining tool, of the bevel on the shape-ground spectacle lens into the bevel groove of the spectacle frame, in such a manner that the spectacle lens is machined smaller by a radial value which corresponds to the distance between the bevel tip on the spectacle lens and the base of the bevel groove of the spectacle frame. A further correction value may, if required, be determined from the reduction in diameter of the spectacle-lens edge-machining tool.

If the compared values lie outside the first and the second tolerance range, the machining of the bevel is broken off, specifically if it turns out that the angle and the depth of the bevel groove of the spectacle frame are greater than the angle and the depth of the bevel groove of the spectacle-lens edge-machining tool, or if the angle of the bevel groove of the spectacle-lens edge-machining tool is greater than a predeterminable maximum value.

A spectacle-lens edge-machining machine which is suitable for solving the problem mentioned at the beginning can have at least one spectacle-lens edge-machining tool with a bevel groove, a rotable spectacle-lens holding shaft which is at least radially adjustable relative to the spectacle-lens edge-machining tool, a control device controlling the spectacle-lens edge-machining machine, an apparatus which is connected to the control device and is intended for scanning the bevel groove of the spectacle-lens edge-machining tool with regard to diameter and cross-sectional shape and circumference, an apparatus which is connected to the control device and is intended for scanning the bevel groove of a spectacle-lens opening in a selected spectacle frame, including the cross-sectional shape, a comparison device in the control device for comparing the values of the cross-sectional shape of the bevel groove of the spectacle frame with the values of the cross-sectional shape of the bevel groove of the spectacle-lens edge-machining tool, and a device for controlling the implementing of the bevels using the determined values, if the compared values of the cross-sectional shapes and of the diameter of the spectacle-lens edge-machining tool lie within a predeterminable first tolerance range or the carrying out of the machining of the bevel using a correction value, if the compared values of the cross-sectional shapes lie within a second tolerance range and/or the diameter of the spectacle-lens edge-machining tool is smaller than a predeterminable minimum value, or the breaking off of the machining of the bevel, if the compared values lie outside both tolerance ranges.

The apparatuses for scanning the bevel groove in the spectacle-lens edge-machining tool and in the spectacle frame may preferably consist of contactless video-scanner systems, which particularly preferably comprise CCD cameras.

These CCD cameras supply data which are digitized via an image-evaluating system in the control device and with the aid of which the comparison of the bevel grooves of the spectacle frame and of the spectacle-lens edge-machining tool can be carried out under computer control, and which enable the bevel groove of the spectacle-lens edge-machining tool and of the spectacle frame to be reproduced on a viewing screen.

However, laser-scanner systems are likewise suitable.

With the aid of the image-evaluating system and a corresponding computer program in the control device, it is furthermore possible for the bevel groove of the spectacle frame and, inserted therein, a bevel of a spectacle lens, corresponding to the bevel groove of the spectacle-lens edge-machining tool, to be reproduced on the viewing screen, so that it can be seen directly on the viewing screen whether the machining of the bevel can be carried out without inserting a correction value, with a correction value or not at all.

However, this representation is used only for information for the operator, since the machining of the bevel is carried out by means of the control device under fully automatic control in accordance with the criteria mentioned above.

Figure 2:
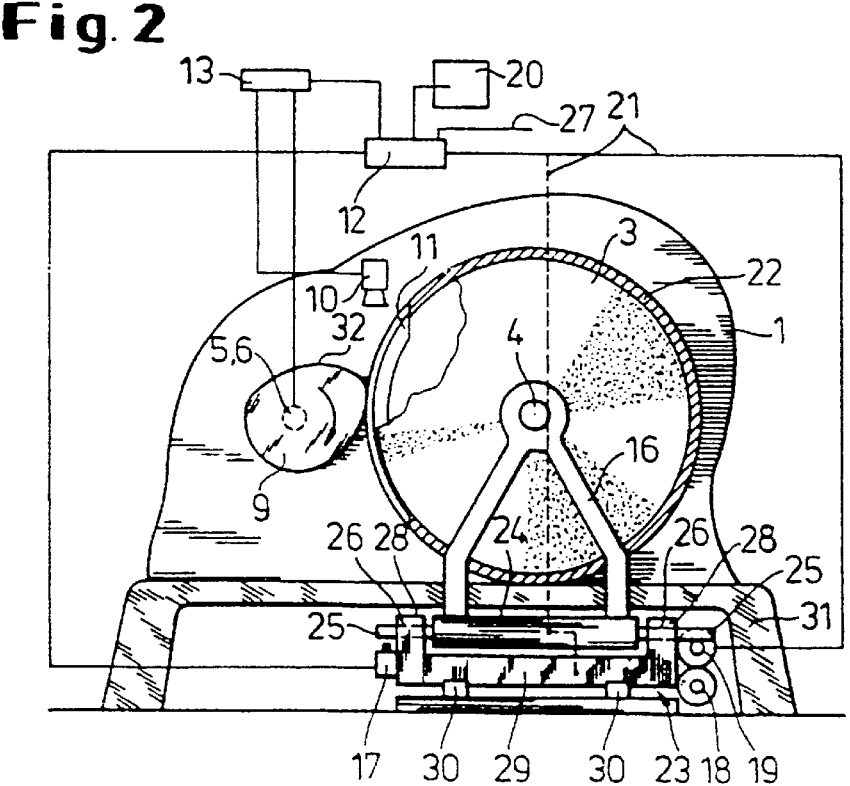
Figure 4:
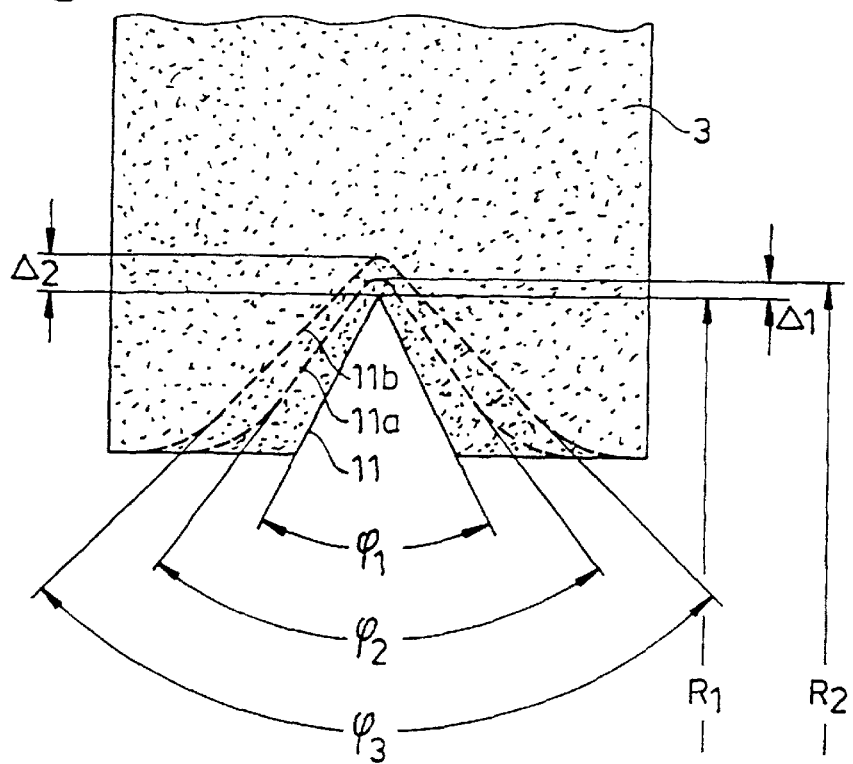
Figure 5:
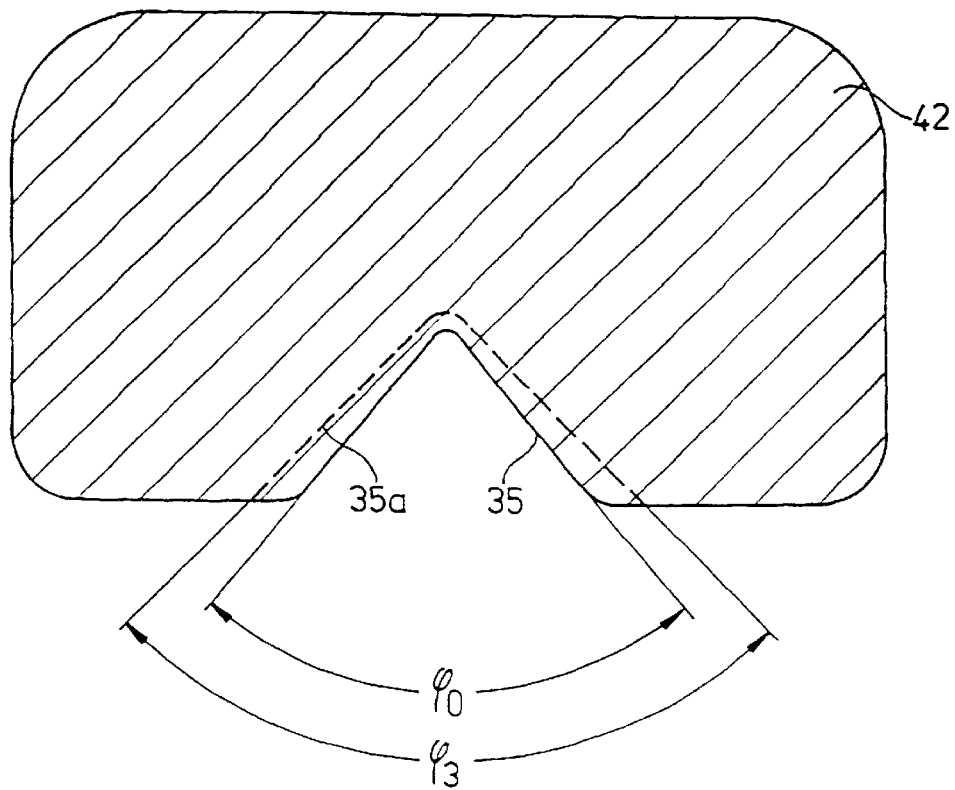
Figure 3:
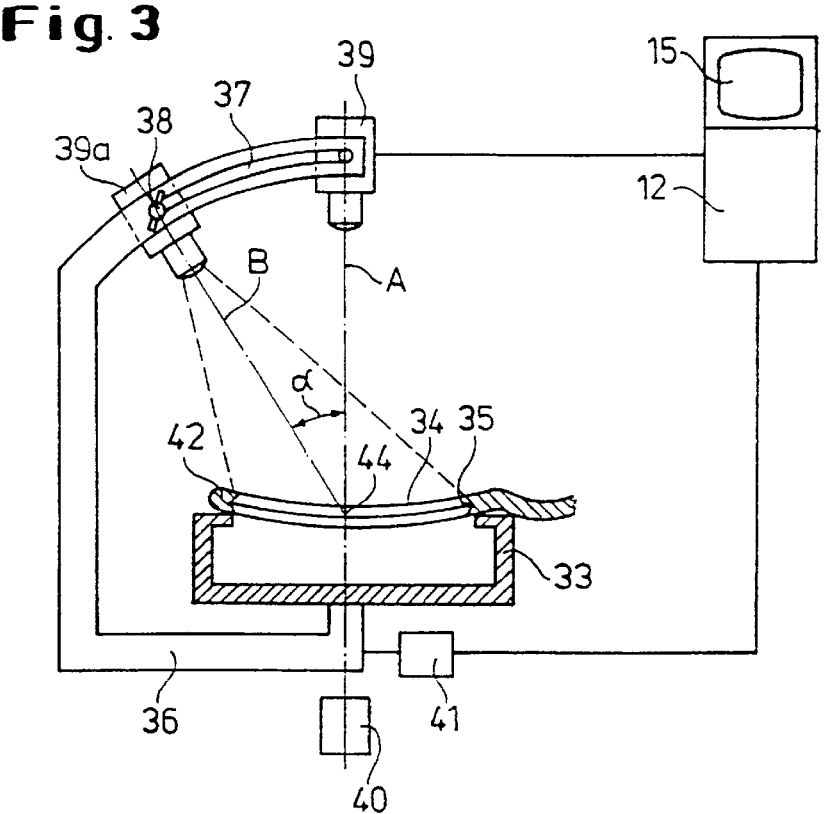

The invention is explained in greater detail in the following with reference to an exemplary embodiment illustrated in the drawing, in which:

FIG. 1 shows a perspective view of a spectacle-lens edge-machining machine according to the invention, FIG. 2 shows a cross section through the spectacle-lens edge-grinding machine according to FIG. 1, FIG. 3 shows a schematic illustration of an apparatus for scanning a bevel groove of a spectacle frame, FIG. 4 shows an enlarged illustration of various bevel groove shapes in a spectacle-lens edge-machining tool, FIG. 5 shows a cross section through a spectacle frame with various bevel groove shapes being illustrated, FIGS. 6 to 9 show an illustration of a spectacle lens which has been ground into shape and has a bevel made on it being fitted into a spectacle-lens opening of a spectacle frame with the formation of the bevel groove in the spectacle frame and of the bevel on the spectacle lens differing as a function of the wear to the spectacle-lens edge-machining tool.

A housing 1 of a CNC-controlled spectacle-lens edge-grinding machine which is known per se is illustrated, in whose grinding chamber 2 three grinding wheels 3 are arranged on a shaft 4. One of the grinding wheels 3 having a cylindrical surface is used for the preliminary grinding of the contour form of a spectacle lens 9, while the two other grinding wheels are used for starting to grind different ridge bevels onto the preliminarily ground spectacle lens 9. The bevel on a grinding wheel is indicated by the reference number 11.

Arranged parallel to the shaft 4 having the grinding wheels 3 is a spectacle-lens holding shaft consisting of coaxial, rotable half-shafts 5, 6, the half-shaft 6 of which can be displaced axially. At their ends the half-shafts 5, 6 have annular holding heads 8, between which an unmachined lens 9 can be clamped. The clamping can take place automatically or via a handle 7.

The grinding of the circumferential edge in accordance with a predetermined shape of the spectacle lens takes place in a known manner under CNC control using a control device 12. The control device 12 is connected to an input apparatus in the form of a keyboard 14 which can be used to input the predetermined contour form, the values for bringing it out of center and, if given, the axial position of a cylindrical or prismatic grinding.

Arranged in the grinding chamber 2 is a CCD camera 10 which is connected to the control device 12 via a converter 13. This CCD camera records an image of the bevel groove 11 in one of the grinding wheels 3, this image being digitized by means of an image-processing system and being processed in a computer of the control device 12.

The values input via the keyboard 14 and the bevel groove 11 recorded by the CCD camera 10 can be reproduced on a viewing screen 15. This is explained in detail with reference to FIGS. 4 to 9.

Reference to FIG. 2 shows that a cross slide 23 is arranged on a machine frame 31, the slide part 24 of which cross slide has guide rods 25 which are mounted in holes 26 of projections 28 of a slide part 29 in a manner such that they can be displaced radially with respect to the spectacle-lens holding shaft 5, 6 with a spectacle lens 9 held by it. The slide part 29 is arranged via guide rails 30 on the machine frame 31 in a manner such that it can be displaced in a direction parallel to the spectacle-lens holding shaft 5, 6 and to the shaft 4 for the grinding wheels 3.

In The shaft 4 is mounted on the slide part 24 by means of bearing supports 16. The grinding wheels 3 and the spectacle lens 9 together with their shafts 4, 5, 6 are surrounded by the housing 1 which has a trough at the bottom which is not illustrated in detail and prevents cooling liquid and abrasive grit from passing into the region of the cross slide 23.

Connected to the spectacle-lens holding shaft 5, 6 is an angle transmitter which is not illustrated in detail and is connected to a computer in the control device 12 via the converter 13.

A displacement transmitter 17 is arranged on the slide part 29 and records the radial displacement of the slide part 24 with respect to the spectacle-lens holding shaft 5, 6. This displacement transmitter 17 is likewise connected to the computer in the control device 12.

The radial displacement of the slide part 24 is brought about by a driving motor 18 which is activated by the control device 12 via control lines 21 and is in driving connection with the guide rods 25 via an electromagnetic coupling 19.

Data records for the circumferential contours of the very wide range of spectacle-lens shapes, desired values and tolerances for the bevel groove 11 in the grinding wheel 3 and other data can be stored in a memory 20.

A spray guard 22 which engages tightly around the grinding wheels 3 and is only open in the region of contact with the spectacle lens 9 ensures that cooling liquid, which is supplied in the region of contact between the grinding wheel 3 and the spectacle lens 9 and also abrasive grit are not swirled around in the grinding chamber 2 in a manner such that the functioning of the CCD camera is impaired. The lens of the CCD camera 10 can additionally be provided with an automatically opening and closing closure flap which only opens if no grinding procedure is taking place.

While the CCD camera 10 serves to record an image of the bevel groove 11 in one of the grinding wheels 3 in a computer-usable form, a video-scanner system, which is illustrated schematically in FIG. 3, is also provided in order to scan a bevel groove 35 in a spectacle-frame opening 34 of a spectacle frame 42. The spectacle frame 42 rests on a carrier 33, which is not illustrated in detail, and is held by means of clamping arrangements, which are not illustrated. A holding device 36 can be rotated about a rotational axis A running through the geometrical central point of the spectacle-frame opening 34, and above the spectacle frame 42 has an arm which is provided with a curved guide 37 whose central point 44 lies on the rotational axis A in the plane of the spectacle-frame opening 34. A video-scanner system 39, which preferably consists of a CCD camera, can be displaced within the curved guide 37 in such a manner that in one position it lies perpendicularly above the spectacle-frame opening 34, so that its optical axis B coincides with the rotational axis A. The video-scanner system 39 can furthermore be adjusted in the curved guide 37, so that its optical axis B forms an angle $\alpha$ with the rotational axis A. The video-scanner system 39 can be fixed in the curved guide 37 by means of a fixing arrangement 38, for example thumb screws. The rotable holding device 36 is provided with a rotational drive 40 and is connected to an angle transmitter 41. Both the video-scanner system 39 and the angle transmitter 41 are connected to the control device 12, so that an image of the spectacle-frame opening 34 and the cross sectional shape of the bevel groove 35 can be shown on the viewing screen 15.

Details of the recording and evaluating of the bevel groove 35 by the video-scanner system 39 are described in DE 40 19 866 A1 by the same applicant. After scanning of the bevel groove 35 and inputting of the measurement data into the control device 12, the corresponding spectacle-lens circumferential contour 32 of an unmachined lens clamped into the spectacle-lens holding shaft 5, 6 can first of all be ground with the aid of the cylindrical preliminary grinding wheel. The contact-pressure force occurring in the process results from the setting of the electromagnetic coupling 19 and can be set differently for spectacle lenses made of plastic or silicate glass and in accordance with the edge thickness of the spectacle lens, which thickness is dependent on the optical values of the spectacle lens. The spectacle lens 9 is caused in a known manner to rotate by means of its shaft 5, 6, the rotational speed generally amounting to 10 to 13 rpm. An angle transmitter, which is not illustrated, transmits a pulse to the computer in the control device 12 at identical angular intervals, for example at increments of 6° each, as a result of which the control device 12 is made to set via the driving motor 18 the applicable radius, which is to be ground, of the spectacle lens 9. During the grinding of the circumferential contour 32 of the spectacle lens 9 on the preliminary grinding wheel, the slide part 29 and therefore the grinding wheel 3 are caused to oscillate parallel to the rotational axis of the spectacle lens 9, the said oscillating movement being changed into the opposite direction in each case at the edge of the preliminary grinding wheel. This movement is controlled by a drive, not illustrated, for the slide part 29 which is likewise connected to the control device 12. This drive of the slide part 29 is also used for starting to grind a bevel onto the spectacle lens 9, whose circumferential contour has been ground, by transferring the spectacle lens 9, which has been ground into shape, into the bevel groove 11 in accordance with the three-dimensional profile of the bevel groove 35 in the spectacle-lens opening 34 of the spectacle frame 42, it being possible for this profile of the bevel to be controlled by means of the control device 12.

After the spectacle-lens circumferential contour 32 has been ground by means of the preliminary grinding wheel in accordance with the illustration in FIG. 2, the spectacle lens 9 is automatically transferred onto the finish-grinding wheel having the bevel groove 11 and is positioned in an exact manner with regard thereto. The spectacle lens 9 has a sufficient machining oversize for the finish grinding.

Before this finish grinding is carried out, the bevel groove 11 in the finish-grinding wheel is compared with the bevel groove 35 in the spectacle frame 42. In order to clarify this procedure, FIG. 4 illustrates a section, recorded by the CCD camera 10, of the grinding wheel 3 with the bevel groove 11 in solid lines, said bevel groove having a flank angle $\phi_1$ which is smaller than the customary angle of a bevel groove in a spectacle frame. This bevel groove 11 having the flank angle $\phi_1$ corresponds to a grinding wheel 3 having a new value. A spectacle lens whose contour has been ground to accurate dimensions can therefore be inserted without any problem into a corresponding spectacle frame and bears with the tip of the bevel against the bevel base of the spectacle frame.

Figure 6:
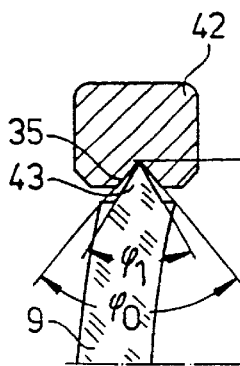
Figure 7:
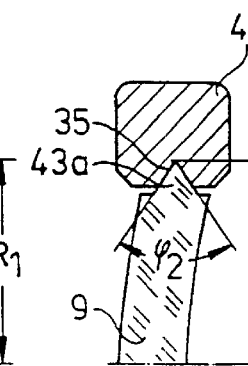

FIG. 6 illustrates this state with regard to a bevel groove 35 in a spectacle frame 42. The bevel groove 35 has an angle $\phi_0$ which is greater than the angle $\phi_1$ of the bevel groove 11 in the finish-grinding wheel 3. A radius $R_1$ of the spectacle lens 9 was marked in FIG. 4 and FIG. 6. The height of the bevel 43, i.e. the depth of the bevel groove 11 in the grinding wheel 3, is greater than the depth of the bevel groove 35 of the spectacle frame 42.

FIG. 5 illustrates a cross section through a spectacle frame 42 having a bevel groove 35 as has been recorded by the video-scanner system according to FIG. 3. This bevel groove 35 has the flank angle $\phi_0$ which has already been mentioned with regard to FIG. 6.

Over the course of time, the bevel groove in the finish-grinding wheel 3 wears and first of all assumes a shape shown by dashed lines and denoted by the reference number 11a in FIG. 4. The angle of this bevel groove of a worn finish-grinding wheel is denoted by $j_2$. It can be seen that at the same time the depth of the bevel groove 11a has increased by the amount $D_1$. If a spectacle lens 9 whose contour has been ground is introduced with a bevel 35, corresponding to FIG. 7, which has the angle $\phi_2$, into the bevel groove 35 of the spectacle frame 42, the spectacle lens 9 having the bevel 43a is oversized by the amount $\Delta_1$ and has the radius $R_2$. By means of the comparison of the bevel groove 35 in the spectacle frame 42 with the bevel groove 11a in the finish-grinding wheel 3, this correction value $\Delta_1$ by which the radius $R_2$ has to be reduced to the radius $R_1$ is taken into consideration in the control device 12, i.e. the spectacle lens 9 is brought closer to the grinding wheel 3 having the bevel groove 11 by the amount $\Delta_1$, so that the bevel 43a is ground in accordance with the dimensions of the bevel groove 35 in the spectacle frame 42, and if the angles $\phi_0$ and $\phi_2$ coincide are fitted into the spectacle frame 42 in the manner illustrated in FIG. 7.

Figure 8:
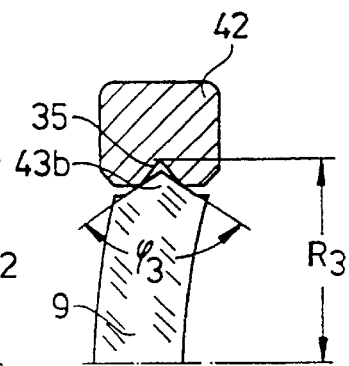

If the finish-grinding wheel 3 has been worn to so great an extent that a bevel groove 11b having an angle $\phi_3$ is reached, which is associated with an increase in the size of the depth of $\Delta_2$, the flattened ridge bevel 43b which has been ground with it and has the angle $\phi_3$ can no longer fit completely into the bevel groove 35 of the spectacle frame 42, but bears with its flanks, as illustrated in FIG. 8, against the outer edges of the bevel groove 35. In this case, the bevel 43b does not penetrate completely into the bevel groove 35 of the spectacle frame 42 and the spectacle lens 9 having this bevel 43b appears larger than it actually is. The computer in the control device 12 can be programmed in the meantime in such a manner that it starts to grind the bevel 43b onto the spectacle lens 9 with such a radius that this spectacle lens can still be inserted into the spectacle frame 42, but in this case the bevel tip of the bevel 43b no longer reaches the base of the bevel groove 35 on the spectacle frame 42. The flank angle $\phi_3$ in FIG. 4 and FIG. 8 corresponds to the permitted maximum value with regard to the flank angle $\phi_0$ of the bevel groove 35 as is illustrated in FIG. 5.

If this angle $\phi_3$ is exceeded, the grinding wheel is no longer suitable for spectacle frames 42 having an angle $\phi_0$ for the bevel groove 35. If, in the meantime, the spectacle frame 42 has a bevel groove 35a with a flank angle $\phi_3$, the grinding wheel can continue to be used, even if the bevel groove 11b has a flank angle $\phi_3$ or more. It therefore turns out that the usability of the grinding wheel with a bevel groove does not follow from an absolute value of the flank angle $\phi$ of the bevel groove 11, but is always set in relation to the flank angle of the bevel groove in the spectacle frame, whereupon the computer in the control device 12 takes a decision as to whether the bevel grinding can be carried out with the determined data, whether it can be carried out with a correction or whether it cannot be carried out at all.

Figure 9:
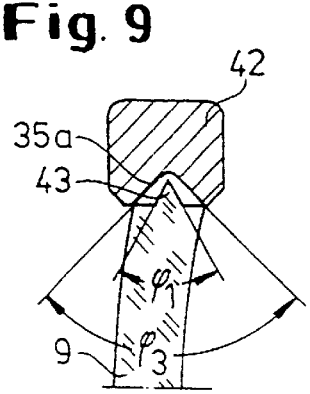

FIG. 9 illustrates the coinciding of a bevel groove 35a having the flank angle $\phi_3$ in the spectacle frame 42 together with a bevel 43 corresponding to the bevel groove 11 of a grinding wheel of new value. In this case, the bevel groove 35a is so deep that the tip of the bevel 43 does not touch the groove base, but the cylindrical regions of the spectacle lens 9 to the sides of the bevel 43 rest on the edges of the bevel groove 35a. It can be seen that in such a case insertion of the spectacle lens 9 into the spectacle frame 42 is not possible, since the spectacle lens is not held securely in the bevel groove 35a.

On the basis of the comparison of the bevel groove 35a, recorded by means of the video-scanner system according to FIG. 3, in the spectacle frame 42 with the bevel groove 11, recorded by means of the CCD camera 10, in the finish-grinding wheel, the control device decides prior to the shape and bevel grinding of the spectacle lens 9 that the machining is not possible and outputs a corresponding signal.

It therefore turns out that the machining of the bevel without taking a correction value into consideration is only carried out if the compared values lie within a predeterminable first tolerance range which covers an angular range of the spectacle-frame bevel groove 35, which is equal to or greater than the angular range of the bevel groove 11 of the spectacle-lens edge-machining tool 3, and covers a depth range of the spectacle-frame bevel groove 35 which is equal to or smaller than the depth range of the bevel groove 11 of the spectacle-lens edge-machining tool 3.

The machining of the bevel with inclusion of a correction value is only carried out if the compared values lie within a second tolerance range, the second tolerance range covering an angular range of the bevel groove 35 of the spectacle frame 42, which is smaller than or equal to the angular range of the bevel groove 11 of the spectacle-lens edge-machining tool 3, in which the maximum value of the angle of the bevel groove 11 of the spectacle-lens edge-machining tool 3 must not exceed a predeterminable value, and the radial correction value is determined from the depth of penetration, which can be calculated from the actual angles of the bevel grooves 11, 35 of the spectacle-lens edge-machining tool 3 and of the spectacle frame 42, of the bevel 43 on the shape-ground spectacle lens 9 into the bevel groove 35 of the spectacle frame 42 in such a manner that the spectacle lens 9 is machined smaller by a radial value Δ which corresponds to the distance between the bevel tip on the spectacle lens 9 and the base of the bevel groove 35 of the spectacle frame 42. A further radial correction value is also taken, into consideration if the mean value of the spectacle-lens edge-machining tool is smaller than a predeterminable minimum value.

In contrast, the machining of the bevel is not carried out at all if it turns out that the angle and the depth of the bevel groove 35 of the spectacle frame 42 are greater than the angle and the depth of the bevel groove 11 of the spectacle-lens edge-machining tool 3, or if the angle of the bevel groove 11 of the spectacle-lens edge-machining tool 3 is greater than a predeterminable maximum value.

This means that the spectacle lens 9 which has been ground into shape and provided with a bevel 43, can always be inserted in a precisely fitting manner into a spectacle frame 42 if the control device 12 decides that the machining of the bevel can be carried out. A correction grinding is not required for this, since any corrections which are required are included from the outset in the computer program for controlling the grinding of the spectacle lens.

The exemplary embodiment which has been illustrated and described relates to a video-scanner system with a CCD camera, however it is not restricted to this, but may also comprise a laser-scanner system.

What is claimed is:

1. A method for producing a bevel on the edge of a spectacle lens using a CNC-controlled spectacle-lens edge-machining machine with the following steps:
   scanning the bevel groove of a spectacle-lens opening in a selected spectacle frame, including the cross-sectional shape and the circumference of the bevel groove,
   inputting the determined values into a control device of the spectacle-lens edge-machining machine,
   scanning the spectacle-lens edge-machining tool with regard to its diameter and the shape of its bevel groove,
   inputting the determined values into the control device of the spectacle-lens edge-machining machine,
   comparing the values of the cross-sectional shape of the bevel groove of the spectacle frame with the values of the cross-sectional shape of the bevel groove of the spectacle-lens edge-machining tool,
   carrying out the machining of the bevel using the determined values, if the compared values of the cross-sectional shapes and the diameter of the spectacle-lens edge-machining tool lie within a predeterminable first tolerance range, or
   carrying out the machining of the bevel using a correction value, if the compared values of the cross-sectional shapes satisfy at least one of lying within a second tolerance range and the diameter of the spectacle-lens edge-machining tool is smaller than a predeterminable, minimum value, or
   not carrying out the machining of the bevel, if the compared values of the cross-sectional shapes lie outside the first and second tolerance range.

2. The method as claimed in claim 1, in which the scanning of the bevel grooves in the spectacle frame and in the spectacle-lens edge-machining tool is carried out in a contactless manner by means of video-scanner systems, and the cross-sectional shape of the bevel grooves is reproduced on a viewing screen.

3. The method as claimed in claim 1, in which the scanning of the bevel grooves in the spectacle frame and in the spectacle-lens edge-machining tool is carried out in a contactless manner by means of laser-scanner systems, and the cross-sectional shape of the bevel grooves is reproduced on a viewing screen.

4. The method as claimed in claim 1, 2 or 3, in which the first tolerance range covers an angular range of the spectacle-frame bevel groove, which is equal to or greater than the angular range of the bevel groove of the spectacle-lens edge-machining tool, and covers a depth range of the spectacle-frame bevel groove, which is equal to or smaller than the depth range of the bevel groove of the spectacle-lens edge-machining tool.

5. The method as claimed in claim 1, 2, 3 or 4, in which the second tolerance range covers an angular range of the bevel groove of the spectacle frame, which is smaller than or equal to the angular range of the bevel groove of the spectacle-lens edge-machining tool, in which the maximum value of an angle of the bevel groove of the spectacle-lens edge-machining tool must not exceed a predeterminable value, and the correction value is determined from a depth of penetration, which can be calculated from the actual angles of the bevel grooves of the spectacle frame and of the spectacle-lens edge-machining tool, of the bevel on the shape-ground spectacle lens into the bevel groove of the spectacle frame, in such a manner that the spectacle lens is machined smaller by a radial value which corresponds to the distance between the bevel tip on the spectacle lens and the base of the bevel groove of the spectacle frame.

6. The method as claimed in claim 1, 2, 3, 4 or 5, in which the machining of the bevel is not carried out if it turns out that the angle and the depth of the bevel groove of the spectacle frame are greater than the angle and the depth of the bevel groove of the spectacle-lens edge-machining tool, or if the angle of the bevel groove of the spectacle-lens edge-machining tool is greater than a predeterminable maximum value.

7. A spectacle-lens edge-machining machine, having
   at least one spectacle-lens edge-machining tool (3) with a bevel groove (11),
   a rotable spectacle-lens holding shaft (5, 6) which is at least radially adjustable relative to the spectacle-lens edge-machining tool (3),
   a control device (12) controlling the spectacle-lens edge-machining machine,
   an apparatus (10) which is connected to the control device (12) and is intended for scanning the spectacle-lens edge-machining tool (3) with regard to its diameter and the cross-sectional shape of its bevel groove,
   an apparatus (39) which is connected to the control device (12) and is intended for scanning the bevel groove (35) of a spectacle-lens opening (34) in a selected spectacle frame (42), including the cross-sectional shape,
   a comparison device in the control device (12) for comparing the values of the cross-sectional shape of the bevel groove (35) of the spectacle frame (42) with the values of the cross-sectional shape of the bevel groove (11) of the spectacle-lens edge-machining tool (3), and
   devices for controlling the carrying out of the machining of the bevel using the determined values wherein, if the compared values lie within a predeterminable first tolerance range, or the devices carry out the machining of the bevel using a correction value, and if the compared values satisfy at least one of lying within a second tolerance range and the diameter of the spectacle-lens edge-machining tool is smaller than a predeterminable minimum value, or the devices not carrying out the machining of the bevel, if the compared values lie outside both tolerance ranges.

8. The spectacle-lens edge-machining machine as claimed in claim 7, in which contactless video-scanner systems (10; 39) are provided for scanning the bevel groove (11) in the spectacle-lens edge-machining tool and the bevel groove (35) in the spectacle frame (42).

9. The spectacle-lens edge-machining machine as claimed in claim 8, in which the video-scanner systems (10; 39) comprise CCD cameras.

10. The spectacle-lens edge-machining machine as claimed in claim 9, in which the control device (12) includes an image-evaluating system using which the bevel groove (35) of the spectacle frame and, inserted therein, a bevel (43) of a spectacle lens (9), corresponding to the bevel groove (11) of the spectacle-lens edge-machining tool (3), can be reproduced on the viewing screen (15).

11. The spectacle-lens edge-machining machine as claimed in claim 7 or 8, in which the control device (12) includes a viewing screen (15) on which, via an image-evaluating system, the bevel groove (11) of the spectacle-lens edge-machining tool (3) and the bevel groove (35) of the spectacle frame (42) are reproduced.

12. The spectacle-lens edge-grinding machine as claimed in claim 7, in which contactless laser-scanner systems (10; 39) are provided for scanning the bevel groove (11) in the spectacle-lens edge-machining tool and the bevel groove (35) in the spectacle frame (42).

* * * * *